(12) United States Patent
Zhang et al.

(10) Patent No.: US 7,640,565 B2
(45) Date of Patent: Dec. 29, 2009

(54) EVER-DECREASING NETWORK QOS REQUIREMENTS FOR STORED VIDEO STREAMING IN A MOBILE WIRELESS INTERWORKING ENVIRONMENT

(75) Inventors: Junbiao Zhang, Bridgewater, NJ (US); Jun Li, Plainsboro, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 401 days.

(21) Appl. No.: 10/518,995

(22) PCT Filed: Jun. 19, 2003

(86) PCT No.: PCT/US03/19521

§ 371 (c)(1),
(2), (4) Date: Dec. 21, 2004

(87) PCT Pub. No.: WO04/002130

PCT Pub. Date: Dec. 31, 2003

(65) Prior Publication Data

US 2006/0156365 A1    Jul. 13, 2006

Related U.S. Application Data

(60) Provisional application No. 60/390,810, filed on Jun. 21, 2002.

(51) Int. Cl.
*H04N 7/18* (2006.01)
*H04N 7/173* (2006.01)

(52) U.S. Cl. .............. 725/81; 725/82; 725/83; 725/106; 725/122; 725/123

(58) Field of Classification Search .................. 725/81, 725/82, 83, 106, 122, 123
See application file for complete search history.

(56) References Cited

U.S. PATENT DOCUMENTS 6,301,231 B1 * 10/2001 Hassan et al. ............... 370/316

(Continued)

FOREIGN PATENT DOCUMENTS

JP    10098706 A    4/1998

(Continued)

OTHER PUBLICATIONS

Search Report Dated Nov. 18, 2003.

*Primary Examiner*—Christopher Kelley
*Assistant Examiner*—Franklin S Andramuno
(74) *Attorney, Agent, or Firm*—Robert D. Shedd; Joseph J. Opalach; Jerome G. Schaefer

(57) ABSTRACT

A method for downloading and displaying a video program using a mobile terminal that includes a first radio access network having a first data transfer rate and a second radio access network having a second data transfer rate faster than the first data transfer rate. The downloaded video program is displayed at a predetermined playback rate. Excess portions of the downloaded video program that result when a rate at which the video program is downloaded exceeds the predetermined playback rate are buffered. A third data transfer rate that is lower than the first transfer rate is calculated in response to the predetermined playback rate, the buffered excess portions and the time duration of the remainder of the video program. The third data transfer rate is negotiated with the first network for downloading the video program when the difference between the first and third data transfer rates exceeds a threshold level.

14 Claims, 3 Drawing Sheets

U.S. PATENT DOCUMENTS

2002/0004840 A1    1/2002   Harumoto et al.
2004/0045030 A1*   3/2004   Reynolds et al. ............ 725/110
2006/0176968 A1*   8/2006   Keaney et al. .............. 375/260

FOREIGN PATENT DOCUMENTS

JP     10126856 A    5/1998
JP     2002-84339 A    3/2002
WO    01/17255 A1    3/2001

* cited by examiner

EVER-DECREASING NETWORK QOS REQUIREMENTS FOR STORED VIDEO STREAMING IN A MOBILE WIRELESS INTERWORKING ENVIRONMENT

This application claims the benefit, under 35 U.S.C. § 365 of International Application PCT/US03/19521, filed Jun. 19, 2003, which was published in accordance with PCT Article 21(2) on Dec. 31, 2003 in English and which claims the benefit of United States provisional patent application No. 60/390,810, filed Jun. 21, 2002.

BACKGROUND OF THE INVENTION

1. Field of the Invention

The present invention generally relates to networking and, more particularly, to a method and a mobile terminal for downloading and displaying a video program in an interworking environment comprising a first radio access network having a first data transfer rate and a second radio access network having a second data transfer rate.

2. Background of the Invention

In an interworking environment that includes two networks such as, for example, a Third Generation (3G) cellular network and a Wireless Local Area Network (WLAN), it is desirable to take advantage of the increased bandwidth of the WLAN. The coupling of a ubiquitous low speed radio access network with a higher speed localized micro-cells provides widespread coverage with high speeds in certain areas. In that regard, a mobile terminal may be able to upgrade to higher data transfer rates when the mobile terminal periodically crosses through the higher bandwidth coverage of the WLAN. Renegotiation of the data transfer rates may be desirable after downloading portions of the video program at high data transfer rates. However, a problem may arise from such renegotiation because it may not be possible to upgrade the data transfer rate from the network (Quality of Service (QoS)) due to temporary congestion in the network. In such instances, the QoS negotiation may not always succeed.

Accordingly, it would be desirable and highly advantageous to have a method and a mobile terminal capable of taking advantage of increased bandwidth in an interworking environment, while overcoming the above-described deficiencies.

SUMMARY OF THE INVENTION

The problems stated above, as well as other related problems of the prior art, are solved by the present invention, which is directed to a method and mobile terminal for managing the downloading and display of a video program by the mobile terminal in an interworking environment. The present invention takes advantage of the increased bandwidth provided in higher bandwidth areas of the interworking environment to reduce the data transfer rate in lower bandwidth areas. This provides many attendant advantages to a user including, e.g., reducing the cost to the user of using the lower bandwidth areas and the probability that the renegotiation of the QoS requirements will succeed.

According to an aspect of the present invention, there is provided a method for downloading and displaying a video program using a mobile terminal in an interworking environment. The interworking environment includes a first radio access network having a first data transfer rate and a second radio access network having a second data transfer rate that is faster than the first data transfer rate. The video program is downloaded through the first or second radio access networks at respective first and second data transfer rates wherein the video program is downloaded at the second data transfer rate when the mobile terminal is in the coverage area of the second radio access network. The downloaded video program is displayed at a predetermined playback rate. Excess portions of the downloaded video program that result when a rate at which the video program is downloaded exceeds the predetermined playback rate are buffered. A third data transfer rate, which is lower than the first data transfer rate, is calculated in response to the predetermined playback rate, the buffered excess portions and the time duration of the remainder of the video program. The third data transfer rate corresponds to the rate required to maintain the current video quality in view of the above. The third data transfer rate is negotiated with the first access network for downloading the video program when the difference between the first and third data transfer rates exceeds a threshold level.

According to another aspect of the present invention, there is provided a mobile terminal for downloading and displaying a video program in an interworking environment. The interworking environment includes a first radio access network having a first data transfer rate and a second radio access network having a second data transfer rate that is faster than the first data transfer rate. A receiver downloads, through the first or second radio access networks, the video program at respective first and second data transfer rates wherein the video program is downloaded at the second data transfer rate when the mobile terminal is in the coverage area of the second radio access network. A display displays the downloaded video program at a predetermined playback rate. A memory device buffers excess portions of the downloaded video program that result when a rate at which the video program is downloaded exceeds the predetermined playback rate. A processor calculates a third data transfer rate, which is lower than the first data transfer rate, in response to the predetermined playback rate, the buffered excess portions and the time duration of the remainder of the video program. The processor controls the negotiation, via a transmitter, of the third data transfer rate with the first access network for downloading the video program when the difference between the first and third data transfer rates exceeds a threshold value.

DETAILED DESCRIPTION OF THE INVENTION

Figure 1:
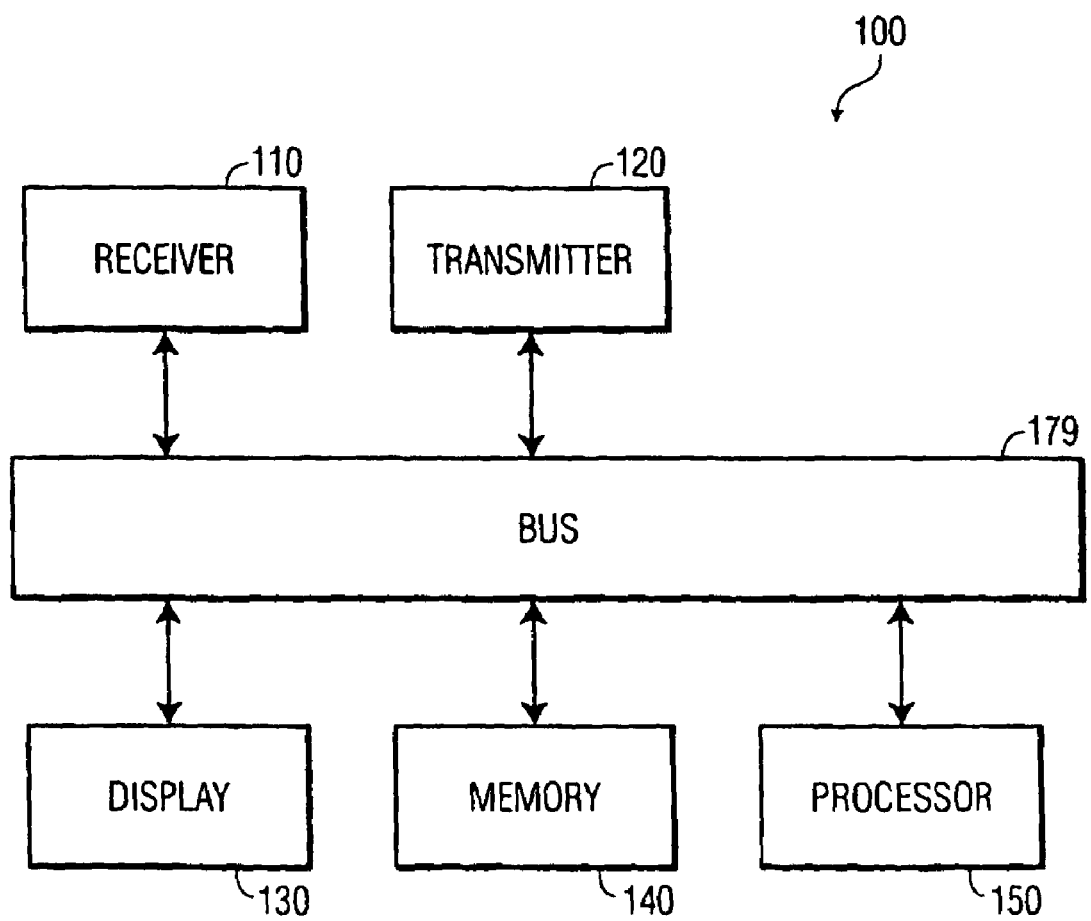
FIG. 1 is a block diagram illustrating a mobile terminal 100 to which the present invention may be applied, according to an illustrative embodiment of the present invention.

The present invention is directed to a method and a mobile terminal for downloading and displaying a video program in an interworking environment. The present invention takes advantage of the increased bandwidth provided in higher bandwidth areas of the interworking environment to negotiate a reduced data transfer rate (QoS) in lower bandwidth areas. Moreover, the present invention provides a methodology to ensure Quality of Service (QoS) renegotiation in the lower bandwidth areas without degrading video quality. As used herein, the phrase "video program" refers to a program that includes, at the least, video data, and may or may not also include other data such as, for example, audio data.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The present invention is directed to an interworking environment. Such an interworking environment may include, for example, ubiquitous low speed first radio access network and a second radio access network having a much higher data transfer speed and lower access cost. The present invention allows users with relatively high mobility to take full advantage of such an environment in stored video streaming applications.

Examples of low rate radio access networks to which the present invention may be applied (e.g., radio A above) include, but are not limited to, fixed or mobile wireless wide area networks such as third generation (3G), second generation plus (2.5G), second generation (2G), and first generation (1G) cellular networks, and so forth. Examples of high rate radio access networks to which the present invention may be applied (e.g., radio B above) include, but are not limited to, Wireless Local Area Networks (WLANs) and so forth. The WLANs may be, for example, those compliant with IEEE 802.11 or Hiperlan 2.

For ease of presentation, the following description of the present invention shall generally employ a 3G cellular network as the first radio access network and a WLAN as the second radio access network. However, it is to be appreciated that the present invention is not limited to the preceding communication technologies and network types and, thus, other communication technologies and network types may also be readily employed by the present invention while maintaining the spirit and scope of the present invention. Moreover, it is to be appreciated that the present invention may be applied to an interworking between more than two networks while maintaining the spirit and scope of the present invention. Further, it is to be appreciated that the present invention may be applied to all or a subset of the networks that are part of an interworking while maintaining the spirit and scope of the present invention.

According to an illustrative embodiment of the present invention, a mobile terminal downloads the video program at the first data transfer rate from the first radio access network, and at the second data transfer rate as the mobile terminal crosses through coverage areas of the second radio access network. The downloaded program data is processed at a predetermined playback rate and displayed on display device. Due to the higher data transfer rate in the second radio access network areas, excess program data may result. The excess program data that result when the download rate exceeds the playback rate is buffered into a memory device. A third data transfer rate can be calculated in response to the predetermined playback rate, the buffered excess portions and the time duration of the remainder of the video program. This third data transfer rate corresponds to the data transfer rate required in view of the above factors. When the difference between the first and third data transfer rates is sufficient, i.e., exceeds a threshold level, the mobile terminal renegotiates the third data transfer rate with the first radio access network for downloading the video program, wherein the third data transfer rate is lower than the first data transfer rate. This ensures that the video quality is not degraded even if the data transfer rate falls to the third data transfer rate for the remainder of the program playback time.

FIG. 1 is a block diagram illustrating a mobile terminal 100 to which the present invention may be applied, according to an illustrative embodiment of the present invention. The mobile terminal 100 includes a receiver 110, a transmitter 120, a display 130, a memory 140, and a processor 150, all interconnected by a bus 179. The receiver 110 and transmitter 120 are configured to receive/transmit data from/to either one of the two radio access networks. The mobile terminal may be, but is not limited to, a cellular phone, a Personal Digital Assistant (PDA), a laptop computer, and so forth. The arrangement and operation of such elements in those devices are well known to those skilled in the art.

Figure 2:
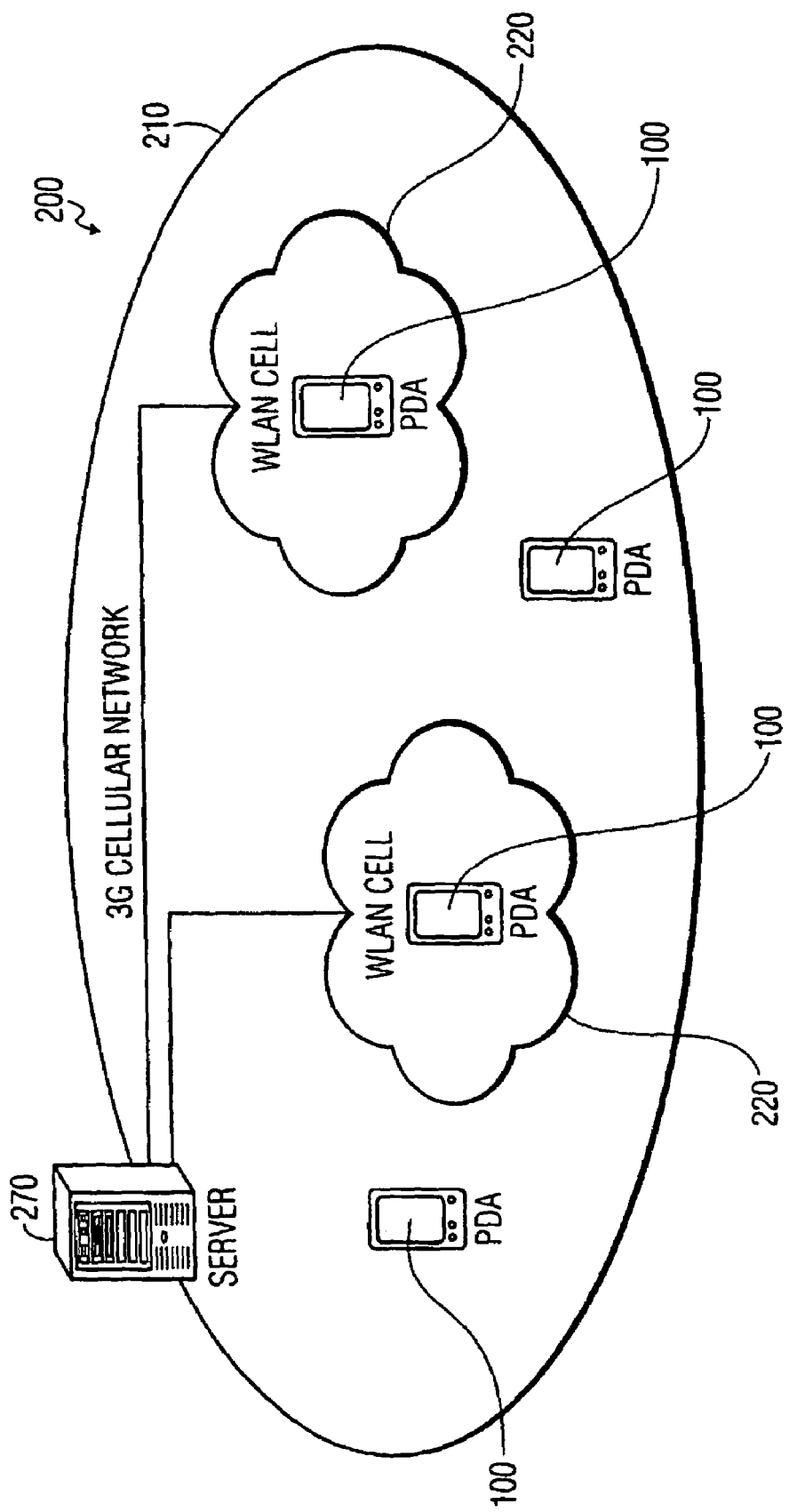
FIG. 2 is a block diagram illustrating an interworking environment 200 to which the present invention may be applied, according to an illustrative embodiment of the present invention.

FIG. 2 is a block diagram illustrating an interworking environment 200 to which the present invention may be applied, according to an illustrative embodiment of the present invention. The interworking environment 200 includes a first radio access network 210, which in the illustrative embodiment is a 3G network, and second radio access network areas 220, which in the illustrative embodiment are WLANs, dispersed there through. A mobile terminal 100 moves through coverage areas of the first and second radio access networks, possibly including areas of dual coverage. A server 270, reachable from both the first radio access network and the second radio access network, provides a source from which a video program can be downloaded to the mobile terminal 100.

It is to be appreciated that the present invention is not limited to precisely the interworking environment shown and described with respect to FIG. 2 and, thus, other interworking environments may also be employed while maintaining the spirit and scope of the present invention.

Once in a WLAN cell, a Mobile Terminal (MT) starts downloading the video program to local storage at the higher WLAN data transfer rate. Given the discrepancy between the downloading rate and the playback rate, after some time has elapsed from the start of downloading, the MT will have a certain amount of buffered video. One way to make use of the buffered amount is to decrease the QoS requirement (data transfer rate) once the MT moves into 3G coverage, thus decreasing the cost of 3G access. With this option, it is desirable to ensure that the video quality will not be degraded throughout the rest of the video session. However, it cannot be assumed that once the QoS requirement on the 3G network is decreased, the QoS requirement can be upgraded at some later time. The problem is that the network may not be able to honor a request to increase the rate due to, for example, temporary congestion in the network. Thus, the present invention provides a method that advantageously decreases the data transfer rate while ensuring that the same quality is maintained for the remainder of the video session.

For illustrative purposes, the following notations are employed herein:

Buffered amount: $B_t$
Data transfer rate in the 3G coverage area: $R_g$,
Playback rate: $R_p$
Time duration for the rest of the video: T
Moreover, the following constraint is employed:

$$(R_p - R_g) * T \leftarrow B_t$$

The MT calculates the new required rate based on the above constraint:

$$R_g' = R_p - B_t / T$$

When the MT decides that there's enough rate difference between the new required rate and the first data transfer rate to renegotiate the rate with the network, the mobile terminal will renegotiate with the 3G network using this new rate. The sufficiency of the rate difference can be determined based on a predetermined threshold level, or may be adjusted for the program as desired. It is apparent that the new rate $R_g'$ is always smaller than the old rate $R_g$. We can see this more clearly as follows. If we didn't enter the WLAN cell, we would have the following equation:

$$R_g = R_p - B_{old} / T$$

where $B_{old}$ is the buffered amount if we didn't enter the WLAN cell. It is apparent that $B_t$ is bigger than $B_{old}$, thus $R_g' < R_g$. Thus the renegotiation will always succeed.

Figure 3:
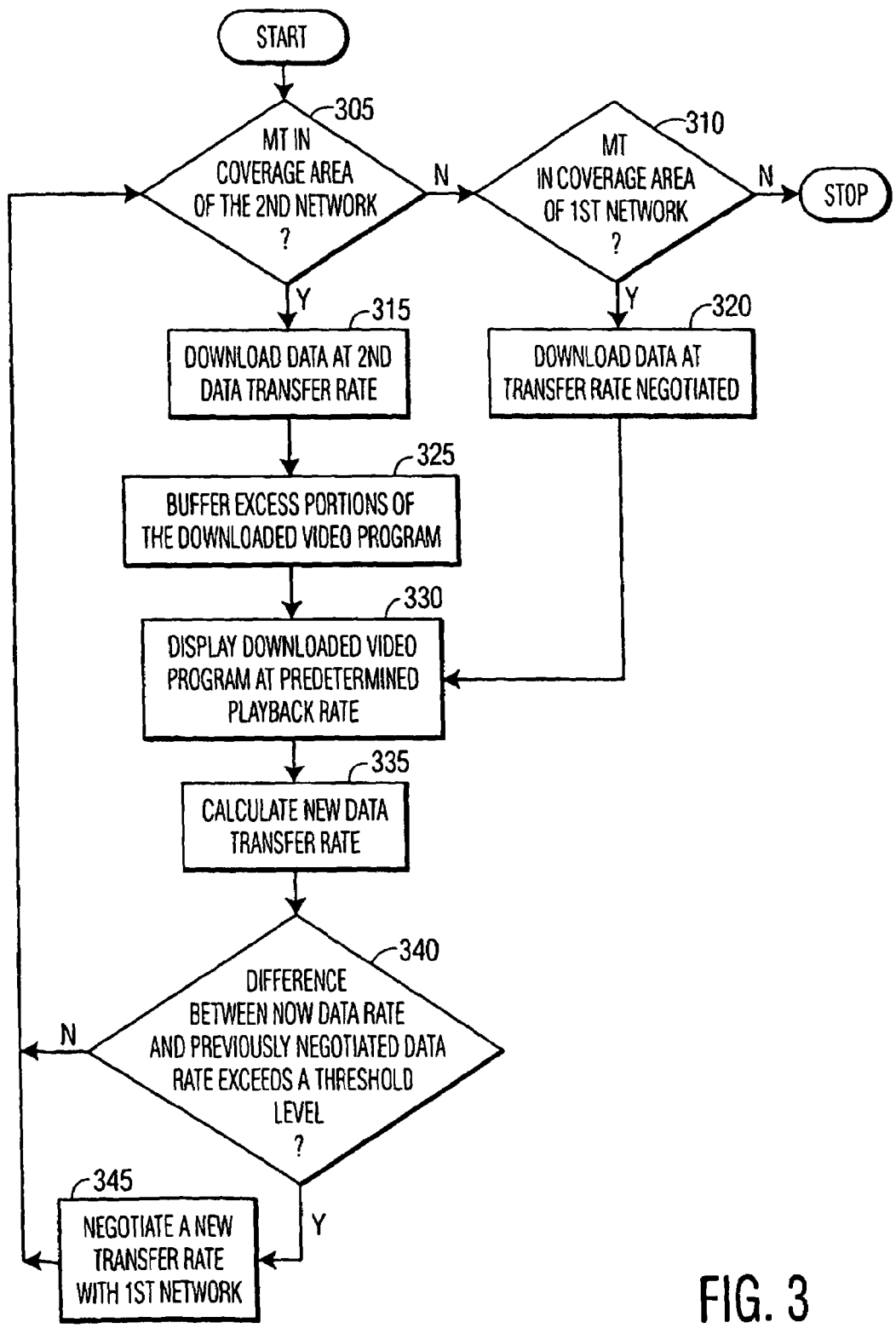
FIG. 3 is a flow chart illustrating the steps for downloading and displaying a video program using a mobile terminal in an interworking environment, according to an illustrative embodiment of the present invention.

FIG. 3 is a flow chart illustrating the steps downloading and displaying a video program in an interworking environment that includes a first radio access network and a second radio access network, according to an illustrative embodiment of the present invention. In the illustrative embodiment of the FIG. 3, the first radio access network has a first data transfer rate, which may be negotiated between a mobile terminal and the first radio access network, and the second radio access network has a second data transfer rate that is faster than the first data transfer rate.

It is determined whether the mobile terminal is in a coverage area of the second radio access network (step 305). If so, the mobile terminal attaches to the second radio access network, if not already done, and downloads the video program at the second (faster) data transfer rate (step 315). As the data transfer rate is higher than the rate at which the data is processed and displayed, an excess develops, and the excess data is buffered, or stored in a memory device in step 325.

If the mobile terminal is not in a coverage area of the second radio access, the mobile terminal determines whether it is in a coverage area of the first radio access network (step 310). If not, the process stops. If so, the mobile terminal downloads the video program at a data transfer rate negotiated with the first radio access network (step 320).

The downloaded video program is displayed on a display device at a predetermined playback rate (step 330). As the downloaded video program is displayed, the mobile terminal calculates, either periodically or continuously, a new data rate in response to the predetermined playback rate, the buffered excess portions and the time duration of the remainder of the video program (335). The new data rate reflects the required data rate for maintaining the quality of the video display in view of the buffered excess portions of the video program and the remaining time of the video program.

The mobile terminal then determines whether the difference between the new data rate determined in step 335 and the currently negotiated data transfer rate with the first radio access network exceeds a threshold level. The threshold level may be a set predetermined level or adjusted as desired (step 340). The threshold value may be equal to, for example, the time duration of the remainder of the video program to be played back multiplied by the difference between the predetermined playback rate and the first data transfer rate. Using the nomenclature defined above, the threshold as previously described may be represented as follows:

$$threshold = T * (Rp - Rg)$$

If difference does not exceeds the threshold level, the process returns to step 305 and continues downloading the video program as desired. If the difference exceeds the threshold level, the process continues to step 345 to renegotiate a new data transfer rate with the first radio access network, which is lower than the previously negotiated data transfer rate. The process then returns to step 305 to continue downloading the video program as desired.

Given the possibility that there may be some overlapping coverage between the first radio access network and the second radio access network, it is to be appreciated that the negotiation of the new data transfer rate with the first radio access network by the mobile terminal may be performed at any time that such negotiation is possible including waiting (or not) for the mobile terminal to be entirely outside the coverage area of the second radio access network. That is, given the teachings of the present invention provided herein, one of ordinary skill in the related art will contemplate these and various other time instances for when the negotiation can take place in relation to the positioning of the mobile terminal with respect to the coverage areas of the first and second radio access networks.

It is also to be appreciated that the mobile terminal may or may not have been in the coverage area of the first radio access network and downloading the video program in that area (at the first (slower) data transfer rate) prior to entering the coverage area of the second radio access network as determined at step 305. That is, the present invention does not require any particular or pre-specified sequence of movements by the mobile terminal through the various networks to obtain the benefits of the present invention. All that is necessary is for buffered excess portions of the downloaded video program to be accumulated in the buffer such that a sufficient rate difference between the first data transfer rate and a new data transfer rate can be generated.

Advantageously, the present invention decreases the network QoS requirement (and, thus, cost) as the direct benefit of "occasionally crossing" WLAN cells. Moreover, the present invention advantageously provides a methodology such that the QoS requirement renegotiation with the network will always succeed. Further, the present invention does not result in any degradation of quality throughout the video session.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. For example, although the present embodiments are described with reference to video programs, it is clear that the present invention is applicable to audio programs, and other multimedia programs that may be downloaded through radio access networks. All such changes and modifications are intended to be included within the scope of the invention as defined by the appended claims.

What is claimed is:

1. A method for downloading a video program using a mobile terminal, the method comprising the steps of:
   Downloading, to the mobile terminal, the video program at a first data rate from a first radio access network;
   continuing to download the video program at a second data rate from a second radio access network when the mobile terminal is in a coverage area of the second radio access network, wherein the second data transfer rate is faster than the first data transfer rate;
   displaying, at the mobile terminal, the downloaded video program at a playback rate;
   buffering, at the mobile terminal, portions of the downloaded video program that result when a rate at which the video program is downloaded exceeds the playback rate;
   calculating, at the mobile terminal, a third data transfer rate, which is lower than the first data transfer rate, in response to the playback rate, the buffered portions, and a time duration of a remainder of the video program; and
   negotiating, with the first radio access network, the third data transfer rate for continued downloading of the video program, when a difference between the first and third data transfer rates exceeds a threshold level.

2. The method of claim 1, wherein the third data transfer rate is equal to $$Rp - B_t/T$$

where Rp is the playback rate, $B_t$ is an amount of the buffered portions of the downloaded video program, and T is the time duration of the remainder of the video program to be played back.

3. The method of claim 1, further comprising the step of continuing to download the video program from the first radio access network using the third data transfer rate when the mobile terminal leaves the coverage area of the second radio access network and is within a coverage area of the first radio access network.

4. The method of claim 1, wherein the negotiating step is performed when the mobile terminal is within the coverage area of the second radio access network.

5. The method of claim 1, wherein the negotiating step is performed after the mobile terminal leaves the coverage area of the second radio access network.

6. The method of claim 1, wherein the first radio access network is a 3G cellular network.

7. The method of claim 1, wherein the second radio access network is a Wireless Local Area Network (WLAN).

8. A mobile terminal for downloading a video program, the mobile terminal comprising:
   a receiver for downloading the video program to the mobile terminal at a first data rate through a first radio access network and a continuing to download the video program at a second data rate through a second radio access network when the mobile terminal is in a coverage area of the second radio access network, wherein the second data transfer rate is faster than the first data transfer rate;
   a transmitter for transmitting data to one of the first radio access network and the second radio access network;
   a memory device for buffering portions of the downloaded video program that result when a rate at which the video program is downloaded exceeds a playback rate; and
   a processor for calculating a third data transfer rate, which is lower than the first data transfer rate, the third data transfer rate calculated in response to the playback rate, the buffered portions, and a time duration of a remainder of the video program, the processor controlling negotiation of the third data transfer rate with the first radio access network for continuing to download the video program when a difference between the first and third data transfer rates exceeds a threshold value.

9. The mobile terminal of claim 8, wherein the third data transfer rate is equal to $$Rp - B_t/T$$

where Rp is the playback rate, $B_t$ is an amount of the buffered portions of the downloaded video program, and T is the time duration of the remainder of the video program to be played back.

10. The mobile terminal of claim 8, wherein the receiver continues to download the video program from the first radio access network using the third data transfer rate when the mobile terminal leaves the coverage area of the second radio access network and is within a coverage area of the first radio access network.

11. The mobile terminal of claim 8, wherein the third data transfer rate is negotiated when the mobile terminal is within the coverage area of the second radio access network.

12. The mobile terminal of claim 8, wherein the third data transfer rate is negotiated after the mobile terminal has left the coverage area of the second radio access network.

13. The mobile terminal of claim 8, wherein the first radio access network is a 3G cellular network.

14. The mobile terminal of claim 8, wherein the second radio access network is a Wireless Local Area Network (WLAN).

* * * * *

UNITED STATES PATENT AND TRADEMARK OFFICE
CERTIFICATE OF CORRECTION

PATENT NO. : 7,640,565 B2  Page 1 of 1
APPLICATION NO. : 10/518995
DATED : December 29, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-first Day of December, 2010

David J. Kappos
*Director of the United States Patent and Trademark Office*